United States Patent [19]

Yu

[11] Patent Number: 5,072,318
[45] Date of Patent: Dec. 10, 1991

[54] DISK FILE WITH ADAPTIVE CANCELLATION OF NONREPEATABLE DISK RUNOUT

[75] Inventor: Mantle M. Yu, San Jose, Calif.

[73] Assignee: International Business Machines Corporation, Armonk, N.Y.

[21] Appl. No.: 479,497

[22] Filed: Feb. 13, 1990

[51] Int. Cl.$^5$ .............................................. G11B 5/596
[52] U.S. Cl. .......................... 360/77.020; 360/77.040
[58] Field of Search ....................... 360/77.020, 77.030, 360/77.040, 77.050

[56] References Cited

U.S. PATENT DOCUMENTS

| | | | |
|---|---|---|---|
| 4,412,161 | 10/1983 | Cornaby | 318/561 |
| 4,616,276 | 10/1986 | Workman | 360/77.04 |
| 4,630,190 | 12/1986 | Alaimo et al. | 360/77.05 |
| 4,679,103 | 7/1987 | Workman | 360/78.07 |
| 4,939,599 | 7/1990 | Chainer et al. | 360/77.03 |

OTHER PUBLICATIONS

*Digital Control of Dynamic Systems*, Franklin and Powell, Addison-Wesley Publishing Co., (1983), Chapter 6, pp. 131-139.
WPI Abstract of German Document DE3632465, Sep. 24, 1986.

Primary Examiner—Aristotelis Psitos
Assistant Examiner—David L. Robertson
Attorney, Agent, or Firm—Thomas R. Berthold

[57] ABSTRACT

In a data recording disk file, a digital servo control system generates an estimate of the sinusoidal function representative of the dominant component on nonrepeatable runout (NRRO) and derives from this function a NRRO signal to add to the digital control signal to eliminate the NRRO component from the head position error signal (PES). The estimate of the sinusoidal function is made from the measured PES and from predetermined constants representative of known disk file physical parameters. In the preferred embodiment, a new estimate of the sinusoidal functional, and accordingly a NRRO signal derived from the newly estimated function, is made during every PES sample time during track following. During track seeking the estimate of the NRRO sinusoidal function is not updated during PES sampling; rather the NRRO signal is derived from the last estimate of the sinusoidal function. With the present invention the effect of NRRO on the PES, such as that caused by drive motor bearing inaccuracies, is essentially cancelled, thereby improving the read/write operations of the disk file.

6 Claims, 3 Drawing Sheets

DISK FILE WITH ADAPTIVE CANCELLATION OF NONREPEATABLE DISK RUNOUT

TECHNICAL FIELD

This invention relates to servo control systems for read/write head positioning in data recording disk files. More particularly, the invention relates to a digital servo control system wherein nonrepeatable movement of the disks relative to the heads is estimated and cancelled by generation of an appropriate control signal.

BACKGROUND OF THE INVENTION

Disk files are information storage devices which utilize a rotatable disk with concentric data tracks containing the information, a head for reading or writing data onto the various tracks, and an actuator connected by a support arm assembly to the head for moving the head to the desired track and maintaining it over the track centerline during read or write operations. In high capacity disk files there are typically a plurality of disks stacked on a hub which is attached to a rotatable shaft. The shaft or spindle is driven by the disk drive motor and is supported at its ends by bearing assemblies which are mounted to the disk file housing. The data on the disks are accessed by heads which are part of head-arm assemblies connected to the actuator. In such disk files, multiple actuators may be used to position the heads to their respective disks in the stack. The movement of the head to a desired track is referred to as track accessing or "seeking", while the maintaining of the head over the centerline of the desired track during a read or write operation is referred to as track "following".

The actuator is typically a "voice coil motor" (VCM) which comprises a coil movable through the magnetic field of a permanent magnetic stator. The application of current to the VCM causes the coil, and thus the attached head, to move radially. The acceleration of the coil is proportional to the applied current, so that ideally there is no current to the coil if the head is perfectly stationary over a desired track.

In disk files which have a relatively high density of data tracks on the disk, it is necessary to incorporate a servo control system to maintain the head precisely over the centerline of the desired track during read or write operations. This is accomplished by utilizing prerecorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline.

In a disk file digital servo control system, a microprocessor utilizes a control signal algorithm to calculate a digital control signal based upon the digital values of certain state variables such as PES, VCM current and head velocity. The digital control signal is converted to an analog signal and amplified to provide input current to the VCM. Such a digital servo control system is described in U.S. Pat. No. 4,412,161, wherein the digital control signal is calculated recursively from prior control signals and prior values of the PES.

Assignee's U.S. Pat. No. 4,679,103 describes a digital servo control system which, as part of the computation of the control signal to the actuator, makes use of a state estimator algorithm to estimate the position and velocity of the head. In this type of system, a microprocessor receives, at discrete sample times, digital values corresponding to the PES and the actuator input current, and computes, through the use of the state estimator algorithm, a digital control signal. The digital control signal is then converted to an analog signal and amplified to provide a new actuator input current. The method of estimating the state of the physical plant to be controlled in such a digital servo control system requires the use of estimator constants, the derivation of which is described in *Digital Control of Dynamic Systems*, Franklin and Powell, Addison-Wesley Publishing Co. (1983), chapter 6, pages 131–139. Assignee's copending application, Ser. No. 249,619, now U.S. Pat. No. 4,914,644, describes a digital servo control system which eliminates the need to measure actuator input current, so that the only variable input to the control system is the digital PES.

There are several causes for the head being off the track centerline during track following and which thus contribute to the PES. Certain position error components are synchronous with disk rotation and are thus repeatable. For example, if the disk is not precisely centered over the axis of rotation of the spindle, the circular tracks will have an eccentric shape relative to the axis of rotation. This will cause a repeatable disk runout error at the same frequency as the rotation of the disk. Assignee's U.S. Pat. No. 4,616,276 describes a servo control system which rapidly removes repeatable error from the PES. Other position error components are not synchronous with disk rotation and occur at a frequency significantly higher than the disk rotation frequency. For example, instability in the drive motor bearing assemblies will contribute a nonrepeatable error component to the PES. Such nonrepeatable runout (NRRO) does have a dominant sinusoidal behavior, although the amplitude, frequency and phase (relative to the disk index mark indicating the beginning of a track) of the runout does not repeat from one disk rotation to the next. German patent application DE 36346 describes a disk file having a special head which detects nonrepeatable wobble of the spindle from signals recorded on an auxiliary track. The signals from the auxiliary track are used to control the position of the data read/write heads during reading and writing of data on the data tracks.

SUMMARY OF THE INVENTION

The present invention is a disk file digital servo control system which generates an estimate of the sinusoidal function representative of the dominant sinusoidal component of nonrepeatable runout for one disk rotation and which derives from this function a NRRO signal to add to the digital control signal to eliminate the dominant sinusoidal component of NRRO from the PES. The estimate of the sinusoidal function is made from the measured PES and from predetermined constants representative of known disk file physical parameters. In the preferred embodiment, a new estimate of the sinusoidal function, and accordingly a NRRO signal derived from the newly estimated function, is made during every PES sample time during track following. During track seeking the estimate of the NRRO sinusoidal function is not updated during PES sampling; rather the NRRO signal is derived from the last estimate of the sinusoidal function. With the present invention the effect of NRRO on the PES is essentially cancelled, thereby improving the read/write operations of the disk file.

For a fuller understanding of the nature and advantages of the present invention, reference should be made to the following detailed description taken in conjunction with the accompanying drawings.

DESCRIPTION OF THE INVENTION

A. Prior Art

Figure 1:
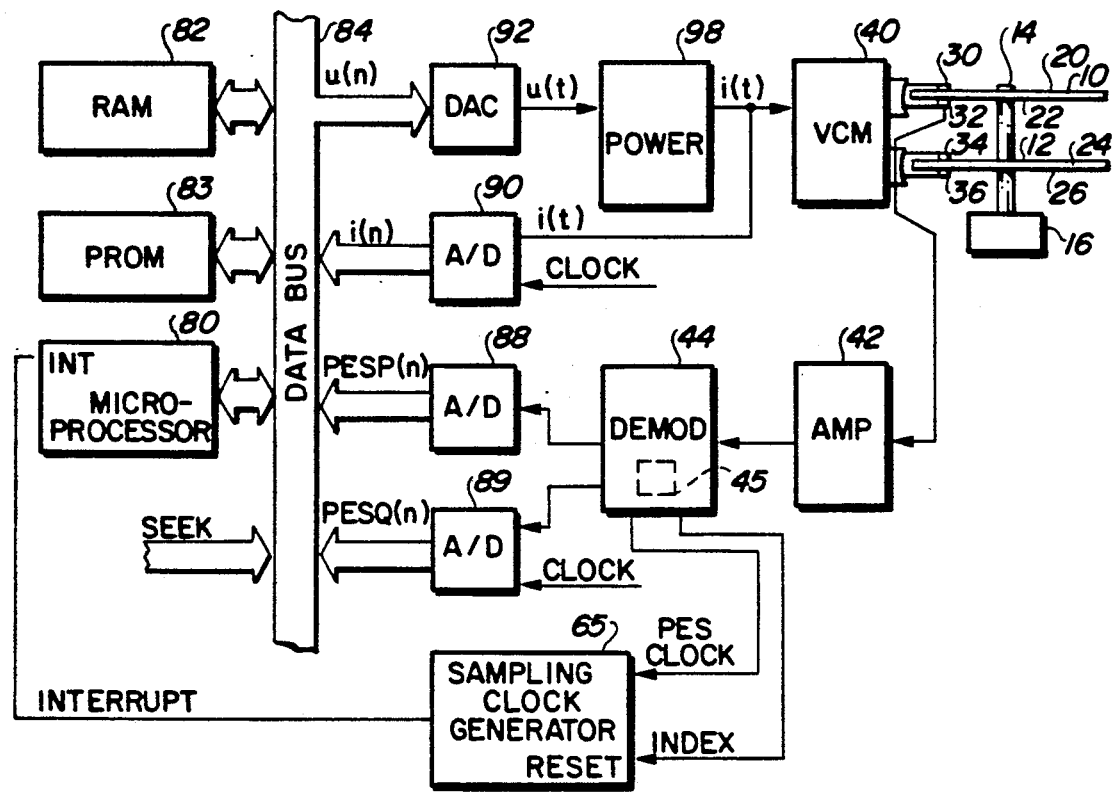
FIG. 1 is a block diagram of a prior art digital servo control system for use with the present invention.

Referring first to FIG. 1, there is depicted a simplified block diagram of a digital servo control system. A pair of disks 10, 12 are supported on a spindle 14 of the disk file drive motor 16. Each of the disks 10, 12 has two surfaces 20, 22 and 24, 26, respectively. For purposes of this description, surface 20 on disk 10 and surfaces 24, 26 on disk 12 are data recording surfaces. Surface 22 on disk 10 is a dedicated servo surface and contains only prerecorded servo information.

Figure 2:
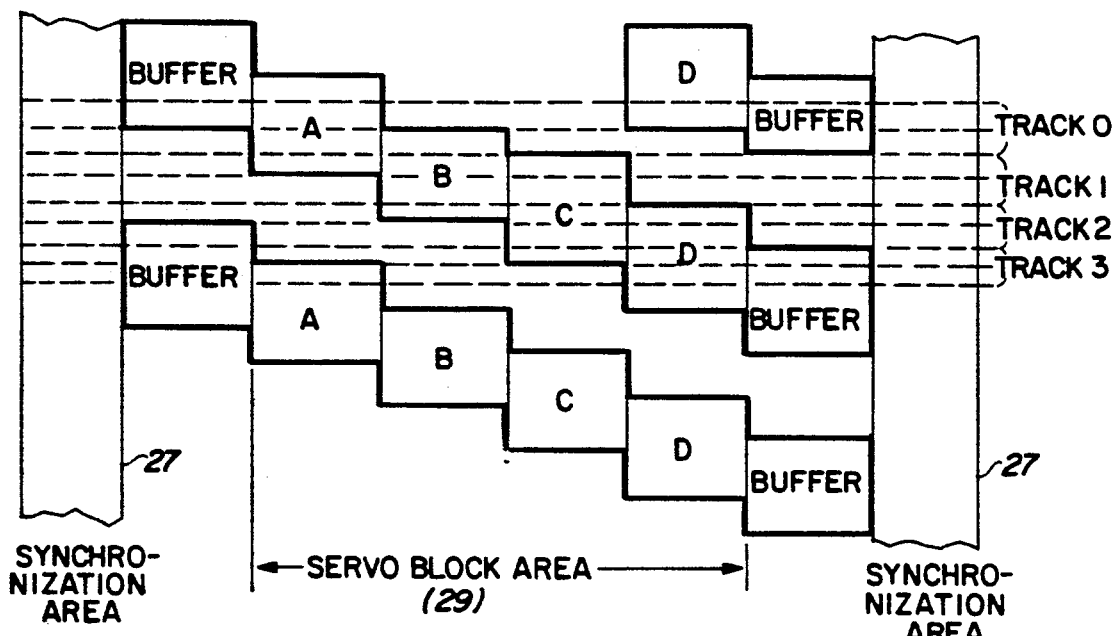
FIG. 2 is an illustration of typical servo timing and position information recorded in the form of a conventional quadrature pattern.

The servo information on disk 10 is recorded in concentric tracks, with the position information typically written in such a manner that the intersections of adjacent servo tracks on servo surface 22 are radially aligned with the centerlines of the data tracks on surfaces 20, 24, and 26. A conventional quadrature servo pattern is depicted in FIG. 2 The servo pattern includes a synchronization area 27, which provides timing information corresponding to the beginning of a set of servo position blocks, and servo block area 29, which provides head position information.

The specific tracks on the data disks and the servo disk are accessed by heads 30, 32, 34, 36, each of which is associated with a respective disk surface and supported by an associated arm assembly. The heads 30, 32, 34, 36 are attached to a common accessing means or actuator, such as VCM 40. Thus the heads 30, 32, 34, 36 are all maintained in a fixed relationship with one another relative to the radial position on their respective disk surfaces.

The signal read by servo head 32 is input to amplifier 42 and then demodulator 44. While the invention is operable with any of numerous types of servo patterns and servo signal demodulation techniques, the servo control system will be explained with reference to the quadrature servo pattern, as represented in FIG. 2. The servo position information in block area 29 in the quadrature pattern on servo surface 22 is demodulated by demodulator 44 to generate two separate analog waveforms, designated primary (PESP) and quadrature (PESQ), as shown in FIG. 1. The analog PESP and PESQ signals from demodulator 44 are sent to analog-to-digital (A/D) converters 88, 89, respectively. The discrete values of PESP and PESQ at any sample time are designated PESP(n) and PESQ(n), where n represents a time index for each digital sample.

A microprocessor 80 is connected by data bus 84 and suitable address bus (not shown) to suitable memory devices, such as read/write memory (RAM) 82 and programmable read only memory (PROM) 83. Microprocessor 80 utilizes a control signal algorithm, as described in the '103 patent, to generate a control signal u(n). The control signal u(n) is output to digital-to-analog converter (DAC) 92 and amplified by power amplifier 98 to generate an analog current i(t) to VCM 40. The analog current i(t) is fed back to analog-to-digital (A/D) converter 90, which provides a digital current signal i(n) to microprocessor 80. Microprocessor 80 thus receives as inputs, at discrete sample times, the digital actuator current i(n) and the digital head position error signals PESP(n) and PESQ(n). (The invention described in assignee's copending application Ser. No. 249,619 describes a servo control system which does not require feedback of VCM current). Microprocessor 80 computes the actual position error signal PES(n) from the values of PESP(n) and PESQ(n), using conventional logic, such as described in the '103 patent. Also shown as input to microprocessor 80 via data bus 84 is a seek command signal from the disk file control unit (not shown). The seek command signal is a digital value which identifies the target track to which the heads are to be re-positioned.

As previously described, demodulator 44 demodulates the position information in servo block area 29 from the quadrature servo pattern (FIG. 2) to generate analog PESP and PESQ signals. Demodulator 44 also contains synchronization detection circuitry 45 which receives the timing information from the synchronization areas 27 of the quadrature servo pattern and outputs a PES clock signal. The PES clock signal is output by synchronization detection circuitry 45 at a frequency corresponding to the rate at which the synchronization areas 27 in the servo pattern pass beneath the servo head 32. Thus the PES clock frequency is determined by the number of discrete sets of servo position blocks 29, (and thus the number of corresponding synchronization areas 27) recorded either on the dedicated servo disk or in sectors on the data disk, and the rotational speed of the drive motor 16. Since the number and spacing of recorded synchronization areas 27 are fixed, the PES clock frequency is solely a function of the rotational speed of drive motor 16.

The PES clock signal synchronization detection circuitry 45 is input to a sampling clock generator 65 which provides an interrupt signal to microprocessor 80. Sampling clock generator 65 may be a digital counter which divides the PES clock frequency by a fixed value to provide the interrupt signal at a frequency substantially slower than the PES clock input frequency. The digital counter is reset for every revolution of the drive motor 16 by an index mark which is recorded on servo disk surface 22 and which identifies the beginning of a servo track.

B. Description of the Preferred Embodiment

Figure 3:
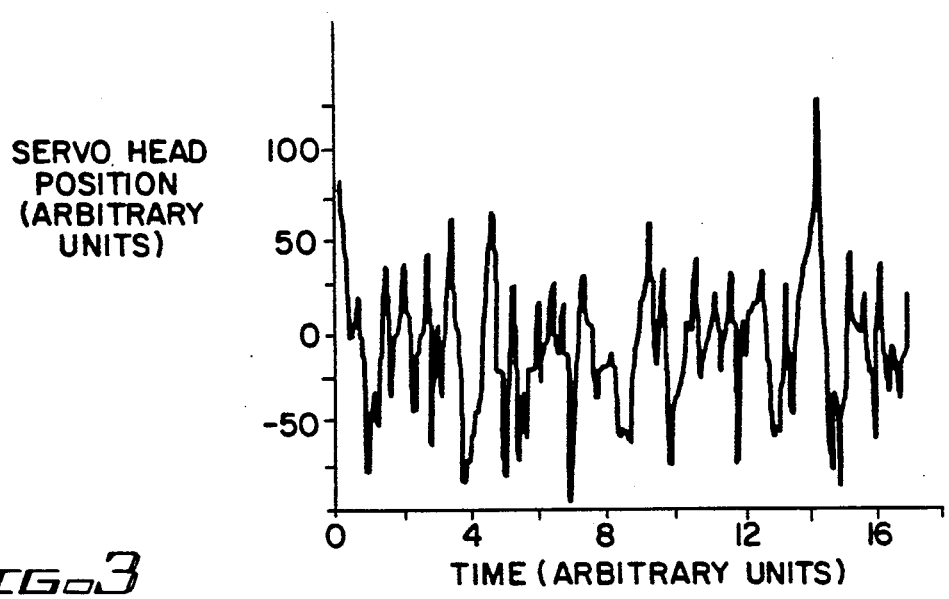
FIG. 3 is a typical PES pattern for one disk rotation without any significant NRRO.
Figure 4:
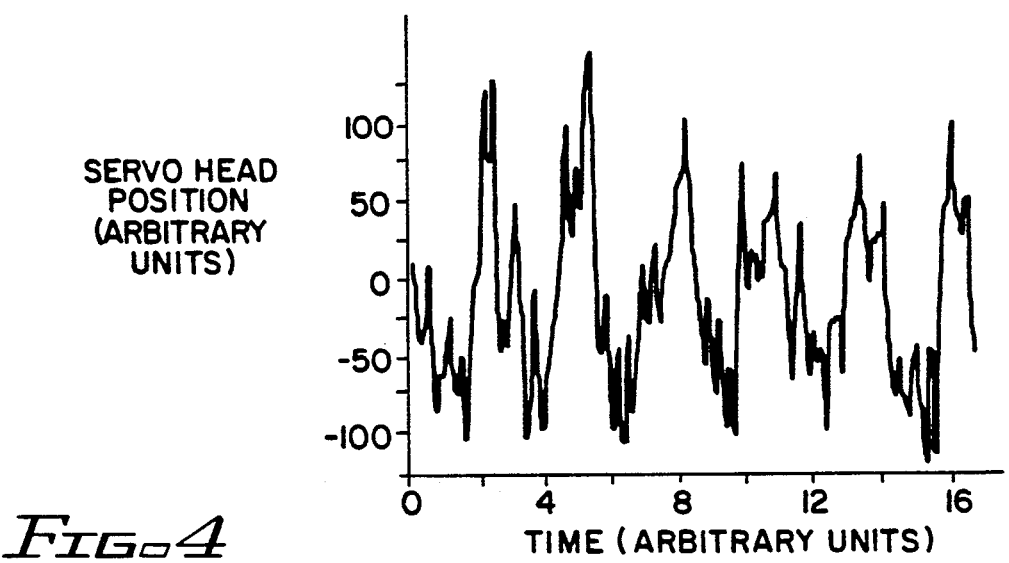
FIG. 4 is a typical PES pattern for one disk rotation with an additional dominant sinusoidal component of NRRO.

The effect of NRRO on the PES pattern can be understood by comparison of FIGS. 3 and 4. FIG. 3 illustrates a typical PES pattern for one disk rotation without any significant NRRO present. This pattern is highly repetitive from one disk rotation to the next and has a maximum PES amplitude of approximately 50. In FIG. 4, however, the presence of NRRO with a dominant sinusoidal component results in a more erratic PES pattern and one which does not repeat from one disk rotation to the next. In addition the NRRO has increased the PES amplitude from 50 to approximately 100.

Figure 5:
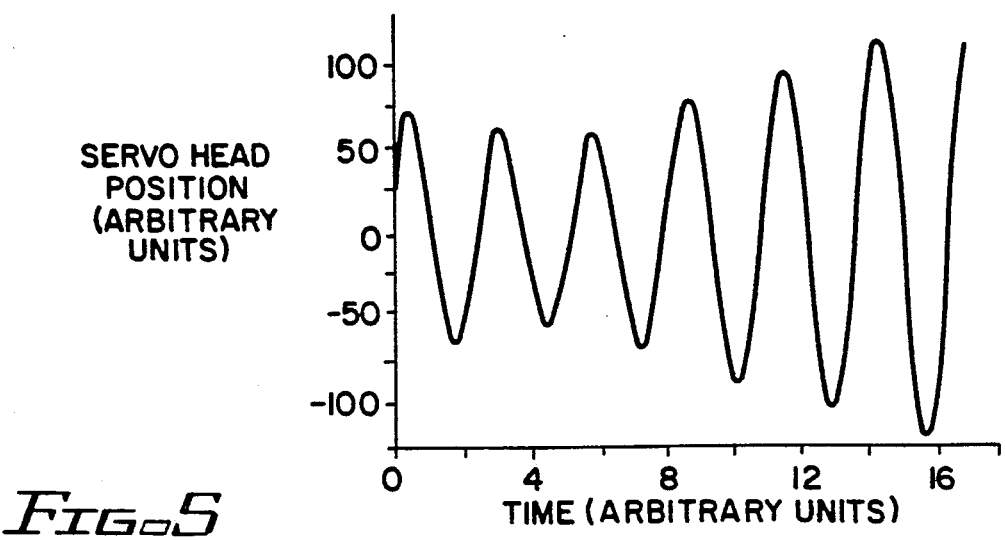
FIG. 5 is an illustration of an estimate of the dominant sinusoidal component of the NRRO present in the PES pattern of FIG. 4.
Figure 6:
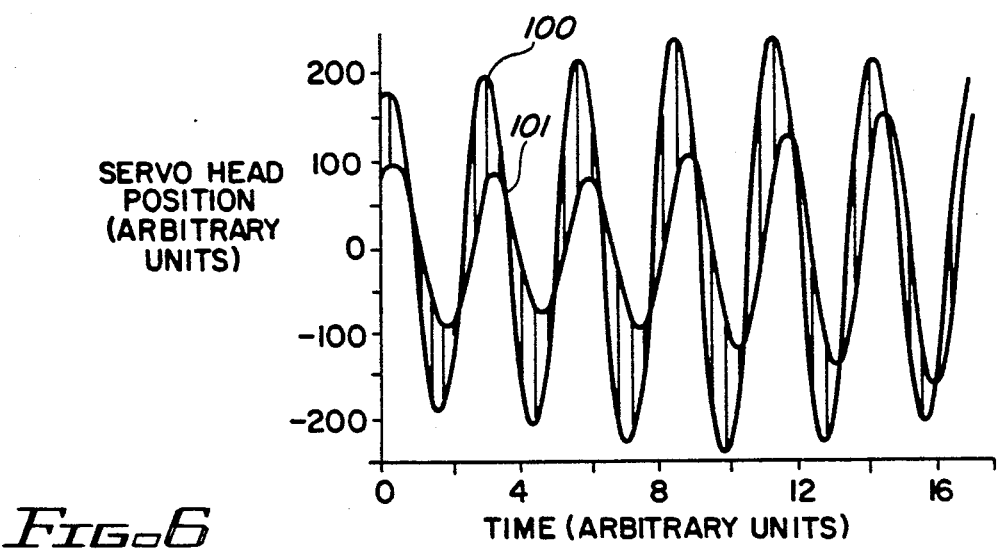
FIG. 6 is an illustration of estimates of the dominant sinusoidal components of NRRO for two successive disk rotations.

The NRRO present in the PES of FIG. 4 has a dominant sinusoidal component which is illustrated in FIG. 5 for a single disk rotation. In the present invention the microprocessor 80 (FIG. 1) generates an estimate of this sinusoidal function and derives a specific NRRO signal which is added to and becomes part of the digital control signal u(n). The sinusoidal function must be continually recalculated because, unlike repeatable runout, it varies significantly from one disk rotation to the next, as illustrated in FIG. 6. As shown in FIG. 6 the NRRO sinusoidal function 100 differs in both amplitude and phase (relative to the index mark indicating the beginning of the track) from the NRRO sinusoidal function 101 for the next successive disk rotation. While in FIG. 6 the functions 100 and 101 appear to have approximately the same frequency, typically the frequency of the NRRO function varies from rotation to rotation. Thus FIG. 6 clearly indicates a need to recalculate the NRRO sinusoidal function on a regular basis in order to provide adaptive cancellation of NRRO from the PES.

The dominant component of the NRRO, as depicted in FIG. 5, is a pure sine function with arbitrary amplitude and phase, which can be represented by the following relationship:

$$A* \sin(W*t) + B* \cos(W*t), \text{ where}$$
$$W = frequency/(2*PI). \quad (EQ.1)$$

The amplitude and phase of the sine function of EQ. 1 are represented as follows:

$$Amplitude = (A^2 + B^2)^{\frac{1}{2}} \quad (EQ.1A)$$

$$Phase = \tan^{-1}(B/A) \quad (EQ.1B)$$

Using this general relationship, and knowing that A, B, and W do not really remain constant, but continuously vary with disk rotation, the digital value of the NRRO signal can be represented as follows:

$$u_R(n) = A(n)* \sin[W(n)*t(n)] + B(n)* \cos[W(n)*t(n)]. \quad (EQ.2)$$

The terms A, B, and W are computed for each PES sample during track following as follows:

$$A(n) = A(n-1) + MU_a*PES(n)* \sin[W(n)*t(n)], \quad (EQ.3)$$

$$B(n) = B(n-1) + MU_b*PES(n)* \cos[W(n)*t(n)], \text{ and} \quad (EQ.4)$$

$$W(n) = W(n-1) + MU_w*PES(n)*t(n)*[Term1(n) + Term2(n)], \quad (EQ.5)$$

where
  $MU_a$, $MU_b$, and $MU_w$ are design constants,
  PES(n) = position error signal at n-th sample, $$Term1(n) = A(n)* \cos[W(n)*t(n)], \quad (EQ.6)$$

$$Term2(n) = -B(n)* \sin[W(n)*t(n)], \text{ and} \quad (EQ.7)$$

$$t(n) = t(n-1) + PES \text{ sampling time.} \quad (EQ.8)$$

The "time" term, t(n), could become arbitrarily large since the control algorithm runs continuously. Thus it is reset to zero at each full period of the estimated NRRO function. This is done whenever the value of t(n) equals or exceeds the estimated period, i.e. $1./[2*PI*W(n)]$.

The upper bounds of the design constants ($MU_a$, $MU_b$ and $MU_w$) can be computed based upon the "least mean squares" algorithm described in *Adaptive Signal Processing*, Widrow, B. and Stearns, S. D., Prentice-Hall, 1985, and expressed as follows as functions of physical parameters of the disk file. In actual implementation, however, experimentally obtained values of $MU_a$, $MU_b$ and $MU_w$ are used to obtain desirable convergence rates. The method to experimentally determine the MU terms will now be explained. First, a simulated NRRO disturbance with a fixed frequency (W held constant) is injected into the disk file by summing a sinusoidal signal into the PES. The term $MU_w$ is set equal to zero and initial equal values of $MU_a$ and $MU_b$ are selected. A step change in amplitude of the NRRO (by increasing the values of A and B) is made and the convergence rate of $MU_a$ and $MU_b$ determined. The values of $MU_a$ and $MU_b$ are incremented and the experiment repeated until instability occurs. The desired values of $MU_a$ and $MU_b$ are then selected. To determine $MU_w$, a simulated NRRO disturbance with fixed amplitude and phase (A and B held constant) is injected into the disk file. An initial value of $MU_w$ is selected and its convergence rate is determined by making a step change in frequency of the simulated NRRO disturbance. The value of $MU_w$ is incremented and the experiment repeated until instability occurs. The desired value of $MU_w$ is selected. An arbitrary simulated sinusoidal NRRO disturbance is then used to determine the performance of the chosen values of $MU_a$, $MU_b$ and $MU_w$.

Figure 7:
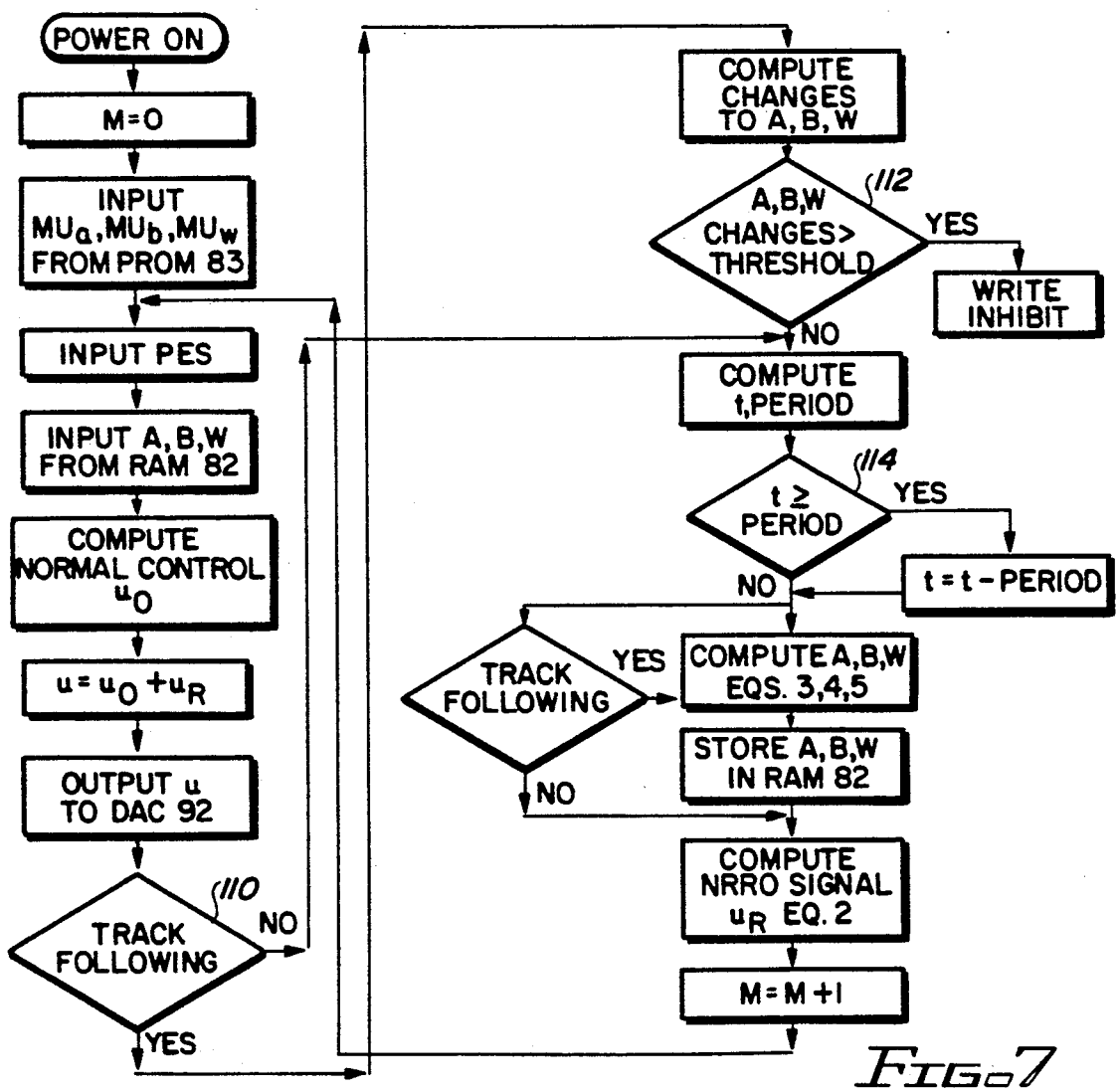
FIG. 7 is a flow chart illustrating the manner in which the NRRO signal is derived and used in the computation of the control signal during both track following and seeking.

Referring now to FIG. 7, the present invention will be explained with respect to the flow chart which describes the method of generation of the NRRO sinusoidal function, the derivation from it of the NRRO signal, and the incorporation of this signal into the control signal to adaptively cancel the NRRO from the PES.

After power on (or at the commencement of a track following sequence), the digital counter "n" is set to zero and the design constants $MU_a$, $MU_b$ and $MU_w$ are input from PROM 83 (FIG. 1). Then the PES and the present values of A, B and W are input to microprocessor 80. (Initial values of A, B and W have been previously stored in RAM 82 and are used only for the initial computation of the NRRO signal, $u_R$). The "normal" control signal, $u_O$, representing the control signal without compensation for NRRO, is then computed. The actual control signal, u, is then computed as the sum of the normal control signal and the NRRO signal, and output to DAC 92.

At decision block 110, if track following is taking place, i.e. no seek command has been received, then changes to A, B and W are computed. These changes are the right hand portions of the expressions on the right side of equations 3, 4 and 5, i.e. the amount the A, B and W values have changed from "n−1" to "n". These change values are important to test the rate at which the NRRO is changing. In certain situations the NRRO may rapidly appear and disappear. Thus, decision block 112 tests whether these change values have exceeded an predetermined threshold and, if so, microprocessor 80 sends a command which inhibits the writing of data.

If A, B and W are within the allowable thresholds then the time term, t, and the period of the NRRO are computed. In decision block 114, the time is compared to the estimated period and then reset if it is greater than the period. The actual computation of A, B and W according to equations 3, 4 and 5 then occurs. These values are stored in RAM 82. The NRRO signal, $u_R$, is then computed, after which the digital counter, n, is incremented and the microprocessor 80 is ready for receipt of the next PES. Thus so long as track following is occurring, the NRRO signal is recalculated for each PES sample by recalculating the terms A, B and W which define the profile of the NRRO. Each such profile is uniquely determined by its characteristic amplitude, phase and period, which are functions of A, B and W. In this manner the NRRO sinusoidal function is adaptively changed between PES samples, so that the NRRO signal which is derived from it and added to the normal control signal is adaptively computed as the NRRO changes.

Referring again to decision block 110 in FIG. 7, if track following is not occurring, i.e. a seek command has been received to move the actuator to a different track, then the terms A, B and W are not recalculated for each PES sample. Rather, the previously generated NRRO sinusoidal function is used so that during a seek $u_R$ is computed as a function only of time, the terms A, B and W remaining constant.

While the preferred embodiment of the present invention has been illustrated in detail, it should be apparent that modifications and adaptations to that embodiment may occur to one skilled in the art without departing from the scope of the present invention as set forth in the following claims.

What is claimed is:

1. An improved data recording disk file of the type having at least one rotatable disk with generally concentric data tracks thereon, the data disk or a separate servo disk having servo information recorded thereon, at least one head for reading the servo information during rotation of the disk, means for deriving from the servo information a head position error signal (PES), an actuator responsive to an input signal and attached to the head for causing the head to seek between tracks and to follow a specific track, and computing means for receiving, at discrete PES sampling times, a digital value corresponding to the PES and for computing a digital control signal for sue by the actuator, the improvement comprising:

said computing means including means for estimating, from the received PES value, a nonrepeatable runout (NRRO) signal for use in the computation of the digital control signal.

2. The improved disk file according to claim 1 wherein said NRRO signal estimating means includes means for generating a sinusoidal function representative of the NRRO and means for deriving said NRRO signal from said sinusoidal function.

3. The improved disk file according to claim 2 wherein the means for generating the sinusoidal function includes means for recalculating the sinusoidal function between received samples of PES values during track following.

4. The improved disk file according to claim 3 wherein the recalculating means includes means for updating the amplitude, phase and period of the sinusoidal function.

5. An improved data recording disk file of the type having at least one rotatable disk with generally concentric data tracks thereon, the data disk or a separate servo disk having servo information and an index mark recorded thereon, at least one head for reading the servo information during rotation of the disk, means for deriving from the servo information a head position error signal (PES), an actuator responsive to an input signal and attached to the head for causing the head to seek between tracks and to follow a specific track, and a processor for receiving, at discrete PES sampling times, a digital value corresponding to the PES and for generating, from the running of a control signal algorithm, a digital control signal for use by the actuator, the improvement comprising:

a memory device coupled to said processor for storing constants representative of predetermined disk file physical parameters; and said processor including (a) means for calculating, during the time between received samples of PES values and from the received PES value and the stored constants, a sinusoidal function representative of an estimate of the nonrepeatable disk runout (NRRO), the sinusoidal function having an amplitude, a phase, and a period relative to the index mark, and (b) means for deriving from said sinusoidal function a NRRO signal for use in the generation of the digital control signal.

6. The improved disk file according to claim 5 further comprising means in said processor for terminating generation of the sinusoidal function between samples of PES values during track seeking, whereby during track seeking the amplitude, phase and period of the sinusoidal function is maintained constant and the NRRO signal is derived from the previously generated sinusoidal function having said constant values of amplitude, phase and period.

* * * * *